United States Patent
Takamoto

(10) Patent No.: US 9,047,209 B2
(45) Date of Patent: Jun. 2, 2015

(54) CONTROLLING COMMUNICATION BETWEEN A POINT OF SALE TERMINAL AND A PRINTER WITHOUT CHANGING AN APPLICATION ON THE POINT OF SALE TERMINAL

(71) Applicant: Seiko Epson Corporation, Tokyo (JP)

(72) Inventor: Akio Takamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/327,043

(22) Filed: Jul. 9, 2014

(65) Prior Publication Data

US 2015/0022853 A1   Jan. 22, 2015

(30) Foreign Application Priority Data

Jul. 18, 2013   (JP) ................. 2013-149175

(51) Int. Cl.
  *G06F 3/12* (2006.01)
  *G06F 13/10* (2006.01)
(52) U.S. Cl.
  CPC ............ *G06F 13/102* (2013.01); *G06F 3/1293* (2013.01)
(58) Field of Classification Search
  CPC .................. G06F 13/102; G06F 3/1293
  USPC ........................................... 358/1.15
  See application file for complete search history.

(56) References Cited

U.S. PATENT DOCUMENTS

| 5,678,059 A | 10/1997 | Ramaswamy et al. |
| 2002/0015172 A1* | 2/2002 | Sugita .................. 358/1.13 |
| 2012/0057184 A1* | 3/2012 | Furuhata et al. ........... 358/1.13 |

FOREIGN PATENT DOCUMENTS

| JP | 08-069427 A | 3/1998 |
| JP | 2006-338443 A | 12/2006 |
| JP | 2010-238042 A | 10/2010 |

* cited by examiner

*Primary Examiner* — Eric A Rust

(57) ABSTRACT

Communication performance can be appropriately and easily improved without changing an application on the host side when controlling communication between electronic devices. A computer that operates according to an operating system on an OS kernel layer, has an application on an application layer that outputs a first unit of command data causing a connected electronic device to perform an operation, and has a communication port on a physical layer that sends data output from the application to the electronic device: receives data output from the application on the OS kernel layer before the data is received by the communication port; accumulates the received data and generates a second unit of data that is larger than the first unit; and outputs the generated second unit of data to the communication port.

11 Claims, 3 Drawing Sheets

CONTROLLING COMMUNICATION BETWEEN A POINT OF SALE TERMINAL AND A PRINTER WITHOUT CHANGING AN APPLICATION ON THE POINT OF SALE TERMINAL

CROSS-REFERENCE TO RELATED APPLICATION(S)

Priority is claimed under 35 U.S.C. §119 to Japanese Application no. 2013-149175, filed on Jul. 18, 2013, the content of which is hereby incorporated by reference in its entirety.

BACKGROUND

1. Technical Field

The present disclosure relates to controlling communications between electronic devices, and relates more particularly to communication control that can desirably and easily improve communication performance without changing an application on the host side.

2. Related Art

Point-of-sale (POS) systems are common throughout the retail industry, including supermarkets. Such systems typically have multiple terminal devices (cash registers) connected to a server over a network, and the terminals operate and execute processes according to locally installed applications. A printer is also usually disposed to each terminal, and produces receipts and coupons as controlled by the application. Systems that are configured similarly to POS systems and produce similar outputs are also used by hospitals and package delivery companies.

As technology improves and business needs change after such systems are first deployed, updating the hardware and expanding the functionality of such systems becomes necessary. However, because these systems are usually central to business operations and are in constant use, and are often complexly linked to other systems, upgrading the system application is usually not easy. For example, when the computers used as the terminals, the printers, or other peripheral devices are replaced with new devices, the existing applications or drivers must also be updated.

This problem as it relates to output process functions has been addressed as described below.

JP-A-H08-69427 discloses a device that embodies a modem function in a personal computer that enables eliminating the memory and microprocessor required by a conventional modem without needing to modify the existing application program.

JP-A-2006-338443 discloses a device that, by accessing a single communication port, can print simultaneously on a printer connected to a different communication port to print duplicate copies of the same content without changing the application.

The literature is silent, however, about how to control the flow of communication when updating the computer or printer is desirable, and how to improve communication performance between electronic devices according to the specifications of the new hardware.

JP-A-2006-338443 also relies on processing at the kernel layer of the operating system, but adding functions to the kernel of the operating system (including program development) is generally not easy, and functions are limited.

SUMMARY

An object of the present invention is to desirably and easily improve communication performance in the control of communication between electronic devices without changing the application on the host side.

One aspect of the invention is a communication control method that executes a communication control process in a computer that operates according to an operating system on an OS kernel layer, has an application on an application layer that outputs a first unit of command data causing a connected electronic device to perform an operation, and has a communication port on a physical layer that sends data output from the application to the electronic device, the communication control method including: receiving data output from the application on the OS kernel layer before the data is received by the communication port; accumulating the received data and generating a second unit of data that is larger than the first unit; and outputting the generated second unit of data to the communication port.

Preferably, the first unit is one byte, and the second unit is one command.

In another aspect of the invention, the second unit is sized based on the data storage capacity of the electronic device when the command is a command instructing rendering an image.

The communication control method according to another aspect of the invention preferably includes sending a signal to stop data output to the application after the data generating step; and sending a signal to resume data output to the application after the data output in the output step is sent to the electronic device.

Further preferably, the communication control method includes sending a signal to stop data output to the application, and outputting data not yet output in the output step to the communication port, if a busy signal is output from the electronic device during data output from the application.

In another aspect of the invention, the computer and the electronic device communicate using the USB protocol.

In another aspect of the invention, the electronic device is a printer.

Another aspect of the invention is a data processing device that operates according to an operating system on an OS kernel layer, has an application on an application layer that outputs a first unit of command data causing a connected electronic device to perform an operation, and has a communication port on a physical layer that sends data output from the application to the electronic device, the data processing device including: a receiver unit that receives data output from the application on the OS kernel layer before the data is received by the communication port; a data generating unit that accumulates the received data and generates a second unit of data that is larger than the first unit; and an output unit that outputs the generated second unit of data to the communication port.

Another aspect of the invention is a computer-readable storage medium storing a program causing a computer to execute the steps of the communication control method according to the invention.

Other objects and attainments together with a fuller understanding of the invention will become apparent and appreciated by referring to the following description and claims taken in conjunction with the accompanying drawings.

DESCRIPTION OF EMBODIMENTS

Figure 1:
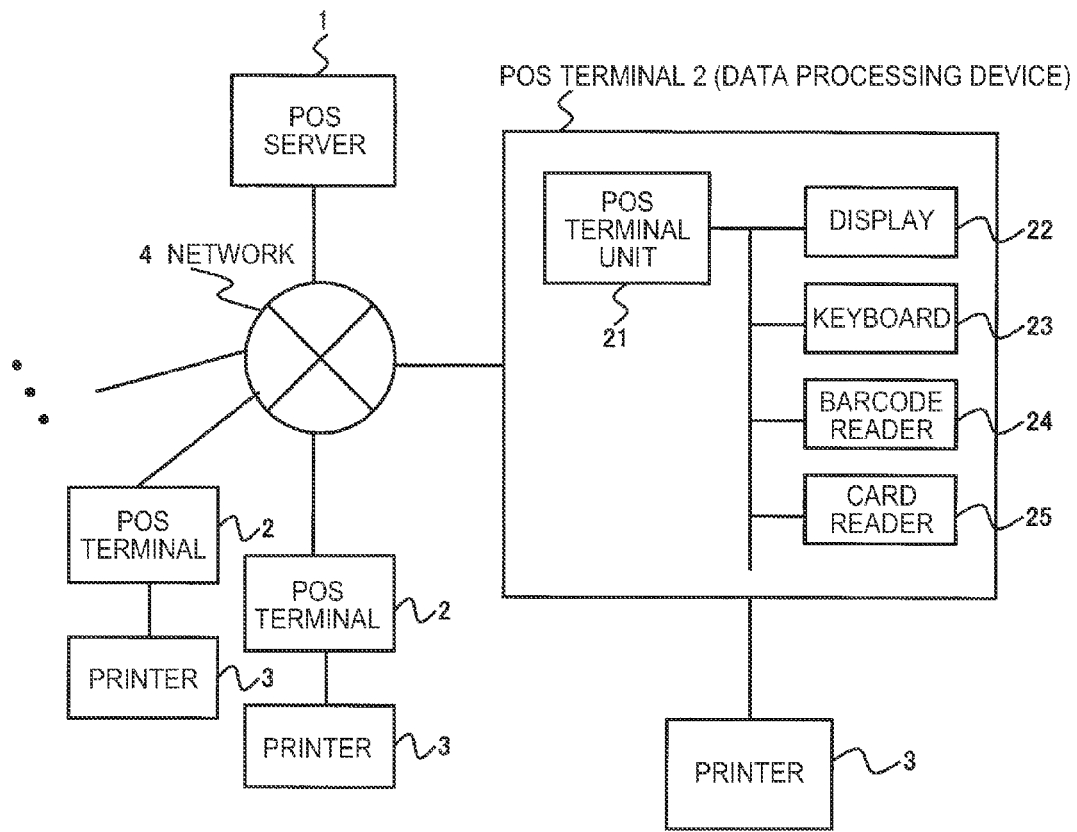
FIG. 1 is a block diagram showing the configuration of a POS terminal device according to the invention.

A preferred embodiment of the present invention is described below with reference to the accompanying figures. This embodiment does not limit the technical scope of the invention. Like or similar parts are also identified by the same reference numerals or reference symbols in the figures.

Figure 2:
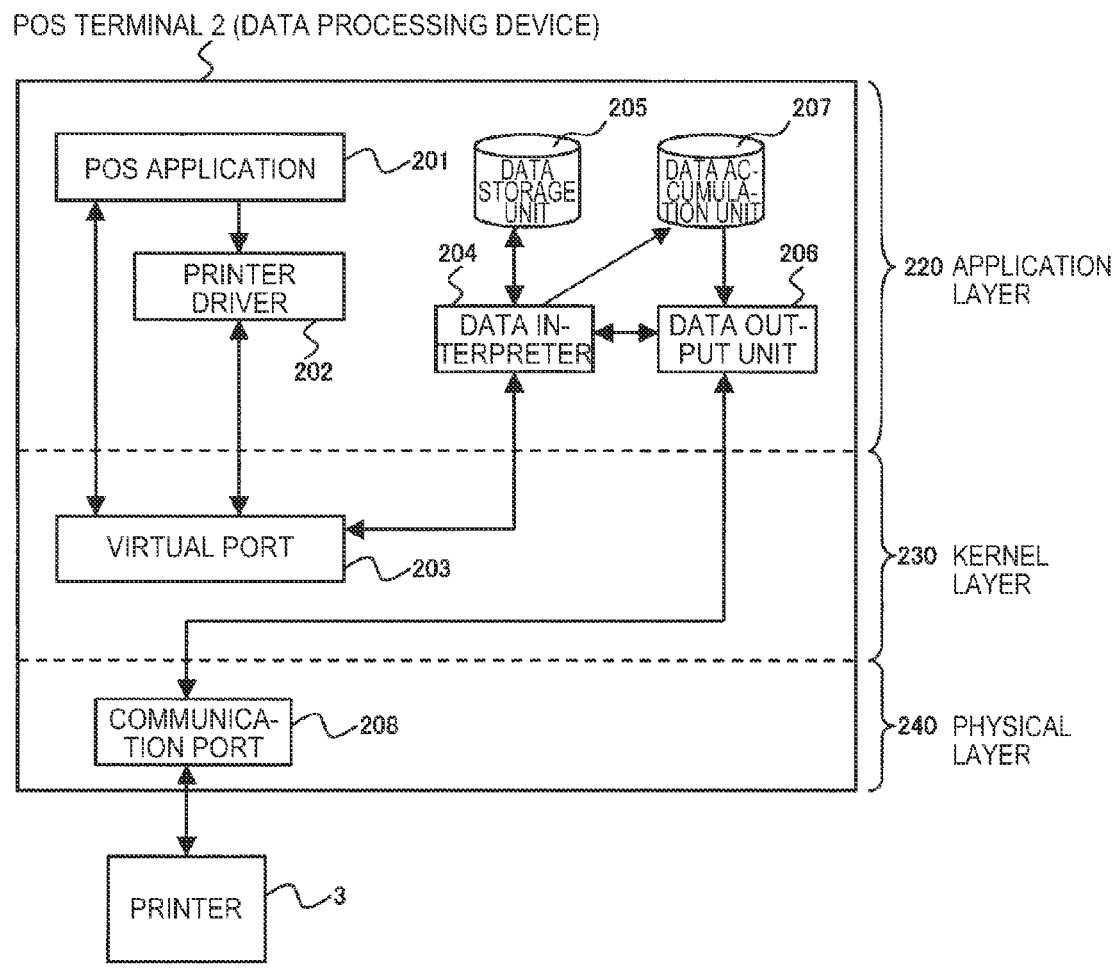
FIG. 2 is a function block diagram of the POS terminal.

FIG. 1 is a block diagram showing the configuration of a POS terminal device according to the invention. FIG. 2 is a function block diagram of the POS terminal. The POS terminal 2 (data processing device) shown in FIG. 1 and FIG. 2 is an example of a device according to the invention. This device receives (acquires) data output from a POS application 201 through a virtual port 203 (receiving unit) on the kernel layer 230 of the operating system before the data is received by the communication port 208, and the received data is then passed to a data interpreter 204 (generating unit) on the application layer 220. The relayed data is stored in a data accumulation unit 207 (generator), and when the data for one command has accumulated, a data output unit 206 (output unit) outputs the data for that command to the communication port 208. By running this process, the POS terminal 2 improves communication performance with the printer 3 without changing the POS application 201 or the printer driver 202.

This embodiment anticipates a POS system used in a supermarket, for example, and as shown in FIG. 1 has a plurality of POS terminals 2 connected to a POS server 1 through a network 4. The POS server is a computer system, manages the plural POS terminals 2, and tabulates, processes, and otherwise manages data acquired from POS terminals 2.

A POS terminal 2 is installed at each checkout register, and is connected to a printer 3. The printer 3 outputs receipts and coupons, for example, based on the print data output from the POS terminal 2. The POS terminal 2 therefore functions as a host device to the printer 3.

As shown in FIG. 1, the POS terminal 2 has a POS terminal unit 21, display 22, keyboard 23, barcode reader 24, and card reader 25. The display 22 displays product prices, for example, for the customer, and the keyboard 23 is used by the operator to input product information including product price and product code information, and customer information such as sex and age. The barcode reader 24 reads a barcode from each product to acquire the product information. The card reader 25 reads information stored on a card, and acquires information required to complete a transaction, for example.

The POS terminal unit 21 generates and outputs to the printer 3 information for printing receipts and coupons based on information acquired from the keyboard 23, barcode reader 24, and card reader 25. The POS terminal unit 21 is a computer, and includes CPU, RAM, ROM, and a hard disk storage device not shown. The POS application 201 program and communication control program described below are stored in ROM, and processes are executed by the CPU operating according to these programs.

The functional configuration of the POS terminal 2 is shown in FIG. 2. The POS application 201 runs a process that generates information for printing a receipt or coupon, outputs the information as print data to a connected printer 3, and controls the printer 3 to print. The generated data is data in a form enabling output directly to the printer 3, or data in a form that is passed to the printer driver 202. The data output directly to the printer 3 is produced for printing text and other simple print data.

The printer driver 202 is a printer driver for the printer, and outputs data output from the POS application 201 as print data that can be received and printed by the printer using commands dependent on the printer model (device).

The print data in this example includes a plurality of commands (a group of commands) that cause the printer 3 to execute a particular printing process.

The POS application 201 and printer driver 202 were installed before the computer and printer 3 of the POS terminal 2 in the POS system are installed (updated), and output print data in a format conforming to the communication specifications of the old computer and old printer. More specifically, they output data one byte (one character) at a time to the communication port 208.

The POS application 201 and printer driver 202 are both on the application layer 220 where programs execute processes based on the operating system (OS) of the computer as shown in FIG. 2. Both the POS application 201 and printer driver 202 are rendered by programs stored in ROM that control the content of the processes, and a CPU executing processes according to the programs.

The virtual port 203 receives print data output from the POS application 201 or printer driver 202 at the OS kernel layer 230 of the operating system before the print data is received by the communication port 208. The virtual port 203 then passes the received acquired data to the data interpreting unit 204.

The data interpreting unit 204 accumulates data passed from the virtual port 203 in the data accumulation unit 207, and interprets the data. The interpreting process determines if it is time to output the accumulated print data to the communication port 208, and notifies the data output unit 206 when it is time to output the data.

Based on this report, the data output unit 206 outputs the print data accumulated in the data accumulation unit 207 to the communication port 208.

The data storage unit 205 stores data used for the data interpreter 204 to interpret the data. This data includes, for example, information for identifying commands and information for determining when a command has completed. The data storage unit 205 is a hard disk drive in this example.

The data accumulation unit 207 temporarily stores print data received by the data interpreter 204 and not yet output by the data output unit 206, and is RAM in this example.

The virtual port 203, data interpreter 204, and data output unit 206 are embodied by programs instructing their respective processes, and a CPU executing the processes according to the programs, for example. The programs related to these parts are an example of a communication control program according to the invention.

The communication port 208 is disposed to the physical device layer 240 of the POS terminal 2, and connects to the printer 3. Communication between the POS terminal 2 and the printer 3 uses the USB standard in this example.

The printer 3 in this example is a color inkjet printer, and prints receipts and coupons as controlled by the POS application 201. As described above, the printer is not the printer that was connected when the POS application 201 was installed, and is a different printer with different communication conditions. The printer 3 has a data buffer (data storage unit) of a specific capacity that temporarily stores print data sent from the POS terminal 2 until the printing process executes.

The POS terminal 2 configured as described above is characterized by the print data transmission process, and the specific content of this process is described below.

When it is time for the POS application 201 of the POS terminal 2 to command the printer 3 to print, the POS application 201 generates print data and outputs one byte (one character) at a time to the communication port 208.

Figure 3:
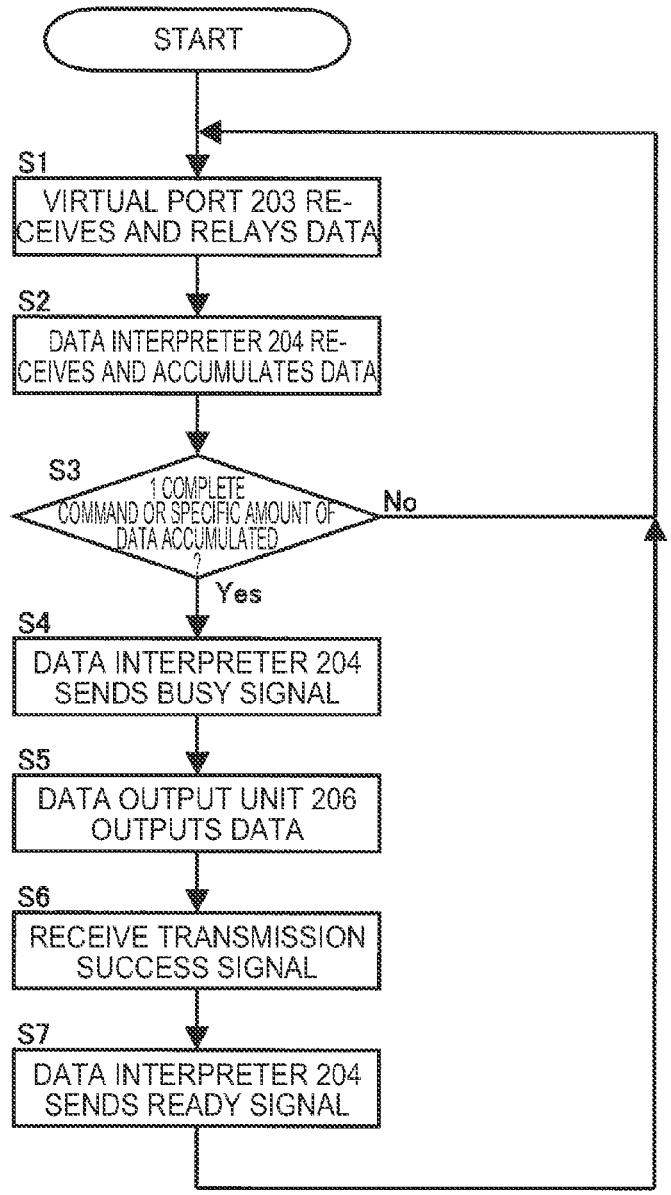
FIG. 3 is a flow chart of steps in the communication control process executed by a communication control program.

FIG. 3 is a flow chart showing an example of steps in the communication control process executed according to the above communication control program.

Before the output print data is received by the communication port 208, the virtual port 203 receives the print data from the POS application 201 or printer driver 202, and passes the received print data to the data interpreter 204 (step S1 in FIG. 3).

This reception process is achieved by changing the setting of the registry (priority) so that data for the communication port 208 is first received by the virtual port 203, and this registry change is made when the operating system starts up.

Next, the data interpreter 204 receives the print data passed from the virtual port 203, and accumulates (stores) the data in the data accumulation unit 207 (step S2 in FIG. 3). Because the USB protocol is used for communication between the POS terminal 2 and the printer 3 in this POS system, if data is sent in 1-byte units, the header and footer that are added before and after the actual data are larger than the actual data, communication is extremely inefficient, and communication performance therefore drops.

The data interpreter 204 therefore does not pass data every time data is received from the POS application 201, and instead executes a process to send the data in larger batches when a specific condition is met. More specifically, the data interpreter 204 interprets the received data to first determine if the data relates to a graphics command (image command).

If the decision is that the received data is not a graphics command, the data interpreter 204 determines if one command is completed by the data accumulated in the data accumulation unit 207 (step S3 in FIG. 3). In other words, the data interpreter 204 determines if the received data is the last data in a command.

If the received data is for a graphics command, the data interpreter 204 determines if the amount of data currently accumulated in the data accumulation unit 207 has reached a preset size (step S3 in FIG. 3). This preset amount of data in this example is half the capacity of the data buffer of the printer 3.

Note that data stored in the data storage unit 205 is used in these interpreting processes.

If the decision in step S3 is that the condition is not met, that is, that one command is not completed or that the accumulated graphics data has not reached the preset amount (step S3 in FIG. 3 returns NO), the process returns to step S1, and receiving data from the POS application 201 continues without sending the accumulated data to the communication port 208.

When sufficient data accumulates in the data accumulation unit 207 that step S3 determines the condition is met, that is, that one complete command has been received or that the accumulated graphics data has reached the preset amount (step S3 in FIG. 3 returns YES), the data interpreter 204 sends a busy signal indicating the data interpreter 204 is busy to the POS application 201, and stops data transmission from the POS application 201 (step S4 in FIG. 3). The data interpreter 204 also notifies the data output unit 206 that it is time to send the data.

Triggered by this notice, the data output unit 206 outputs the data accumulated in the data accumulation unit 207 in one batch to the communication port 208 (step S5 in FIG. 3). If the data is not a graphics command, data for one command is sent. The data output unit 206 then deletes the data stored in the data accumulation unit 207.

The print data output to the communication port 208 is sent through the communication port 208 to the printer 3. When transmission to the printer 3 ends (is successful), a transmission success signal is sent from the printer 3, and the transmission success signal is passed through the communication port 208 and data output unit 206, and received by the data interpreter 204 (step S6 in FIG. 3).

When this signal is received and the success of the data transmission is confirmed, the data interpreter 204 sends a ready signal indicating cancellation of the busy state to the POS application 201 to resume data transmission (step S7 in FIG. 3).

The process then returns to step S1 and the process repeats until output of print data from the POS application 201 (data transmission for one print job) ends.

As described above, the POS terminal 2 outputs data that is sent in 1-byte units in units of one command or a specific amount of data.

When a busy signal is issued from the printer 3 during the above transmission process, the busy signal is received by the data interpreter 204, and the data interpreter 204 sends the busy signal to the POS application 201, and stops data transmission from the POS application 201 as described in step S4 above. If data remains in the data accumulation unit 207 in this event, the data output unit 206 outputs the remaining data to the printer 3 in response to a command from the data interpreter 204. As a result, all data output from the POS application 201 before the printer 3 became busy is sent to the printer 3, and a match between the data output from the POS application 201 and the data received by the printer 3 can be maintained.

Communication between the POS terminal 2 and printer 3 is based on the USB standard in the above example, but other communication methods in which communication performance is improved by sending data in batches may also be used.

As described above, because data sent by the application in units of 1-byte at a time using a slow communication protocol is accumulated until one complete command is received, and the data is then output by the POS terminal 2 by command unit, for example, data can be transmitted efficiently using a communication protocol such as USB, and communication performance can be improved.

As a result, when the POS terminal 2 computer or printer 3 in an existing POS system are upgraded to new devices, and a new method (such as USB) is used for communication therebetween, communication performance can be easily improved without changing the existing POS application 201 by adding the communication control program described above.

Suitable flow control is also possible during data transmission after a batch of data has accumulated because a busy signal is output to the POS application 201 to stop data output from the POS application 201, and data output is then resumed after data transmission to the printer 3 has succeeded.

The data buffer is also prevented from overflowing because data is sent to the printer 3 one command at a time or in batches sized according to the capacity of the data buffer in the printer 3.

When the printer 3 is physically busy, an appropriate process is executed as described above the data output from the POS application 201 and the data received by the printer 3 continue to match.

Furthermore, by identifying the data output from the POS application 201 and determining the communication timing are done on the application layer 220, advanced processes can be executed relatively easily.

The foregoing embodiment describes a system having a POS server 1 connected to a plurality of POS terminals 2, but the invention is not so limited and can be applied to environments in which a POS terminal is connected to a printer.

The foregoing embodiment is described as applied to a POS system, but the invention is not limited to POS system, can be applied to other systems having a specific application that produces printout from a printer, such as systems used in hospitals and package delivery companies, and is particularly effective when modifying an existing application program is difficult.

This embodiment of the invention describes a configuration having a POS terminal connected to a printer, but the invention can also be applied to configurations having an electronic device other than a printer, such as a projector or a monitor, and a host device connected to the electronic device.

The POS application program and communication control program are stored in ROM in the foregoing example, but the invention may store the programs in RAM, a hard disk drive, or other storage medium instead of ROM. The programs may also be stored to separate storage media.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A communication control method that executes a communication control process in a computer that operates according to an operating system on an OS kernel layer, has an application on an application layer that outputs a first unit of command data causing a connected electronic device to perform an operation, and has a communication port on a physical layer that sends data output from the application to the electronic device, the communication control method comprising:
   receiving data output from the application on the OS kernel layer before the data is received by the communication port;
   accumulating the received data and generating a second unit of data that is larger than the first unit;
   outputting the generated second unit of data to the communication port;
   sending a signal to stop data output to the application after the data generating step; and
   sending a signal to resume data output to the application after the data output in the output step is sent to the electronic device.

2. The communication control method described in claim 1, wherein:
   the first unit is one byte; and
   the second unit is one command.

3. The communication control method described in claim 1, wherein:
   when the command is a command instructing rendering an image, the second unit is sized based on the data storage capacity of the electronic device.

4. The communication control method described in claim 1, further comprising:
   sending a signal to stop data output to the application, and outputting data not yet output in the output step to the communication port, if a busy signal is output from the electronic device during data output from the application.

5. The communication control method described in claim 1, wherein:
   the computer and the electronic device communicate using the USB protocol.

6. The communication control method described in claim 1, wherein:
   the electronic device is a printer.

7. A data processing device that operates according to an operating system on an OS kernel layer, has an application on an application layer that outputs a first unit of command data causing a connected electronic device to perform an operation, and has a communication port on a physical layer that sends data output from the application to the electronic device, the data processing device comprising:
   a receiver that receives data output from the application on the OS kernel layer before the data is received by the communication port;
   a data generator that accumulates the received data and generates a second unit of data that is larger than the first unit; and
   an output component that outputs the generated second unit of data to the communication port; wherein
   the generator sends a signal to stop data output to the application after generating the second unit of data and sends a signal to resume data output to the application after the data output by the output component is sent to the electronic device.

8. The data processing device described in claim 7, wherein:
   the first unit is one byte; and
   the second unit is one command.

9. The data processing device described in claim 7, wherein:
   when the command is a command instructing rendering an image, the second unit is sized based on the data storage capacity of the electronic device.

10. The data processing device described in claim 7, wherein:
    the generator sends a signal to stop data output to the application, and outputs data not yet output by the output component to the communication port, if a busy signal is output from the electronic device during data output from the application.

11. A non-transitory computer-readable storage medium storing a program causing a computer to execute the steps of the communication control method described in claim 1.

* * * * *